US012794774B2

(12) United States Patent
Bisset

(10) Patent No.: US 12,794,774 B2
(45) Date of Patent: Nov. 10, 2026

(54) REVISION CONTROL SYSTEMS AND METHODS ACROSS DISPARATE NETWORKS

(71) Applicant: Tactware, Huntsville, AL (US)

(72) Inventor: Kerry Bisset, Madison, AL (US)

(73) Assignee: TACTWARE, INC., Huntsville, AL (US)

(*) Notice: Subject to any disclaimer, the term of this patent is extended or adjusted under 35 U.S.C. 154(b) by 3 days.

(21) Appl. No.: 19/191,578

(22) Filed: Apr. 28, 2025

(65) Prior Publication Data

US 2026/0342655 A1 Oct. 29, 2026

(51) Int. Cl.

| | |
|---|---|
| ***G06F 15/16*** | (2006.01) |
| ***G06F 9/54*** | (2006.01) |
| ***H04L 29/06*** | (2006.01) |
| ***H04L 41/0859*** | (2022.01) |

(52) U.S. Cl.

CPC ................................ *H04L 41/0859* (2013.01)

(58) Field of Classification Search

CPC .................................................. H04L 41/0859
USPC ........................................................ 709/224
See application file for complete search history.

(56) References Cited

U.S. PATENT DOCUMENTS 10,177,976 B2* 1/2019 Berly .................. H04L 41/0806
2004/0073581 A1* 4/2004 McVoy ..................... G06F 8/71 707/999.203
2007/0271303 A1* 11/2007 Menendez .......... G06F 16/1873
2013/0185252 A1* 7/2013 Palmucci ................ G06F 16/93 707/608
2016/0259795 A1* 9/2016 Brandys ................ G06F 40/197
2019/0163459 A1* 5/2019 Sreenivasa ................ G06F 8/71
2019/0207419 A1* 7/2019 Janssen .............. G05B 19/0421
2019/0394088 A1* 12/2019 Narayanan .......... H04L 41/0816
2023/0065530 A1* 3/2023 Mohanty ............... G06F 11/302
2024/0143811 A1* 5/2024 Brenner .............. G06F 21/6218
2024/0143815 A1* 5/2024 Brenner .............. G06F 16/1873
2025/0138806 A1* 5/2025 Singh ........................ G06F 8/71

(Continued)

FOREIGN PATENT DOCUMENTS

CN 109308188 B * 6/2021 ............... G06F 8/70
CN 118377527 A * 7/2024 ............... G06F 8/65
CN 114090067 B * 10/2025 ............... G06F 8/65

(Continued)

*Primary Examiner* — Hamza N Algibhah
(74) *Attorney, Agent, or Firm* — DENNEN IP LAW, LLC

(57) ABSTRACT

The present disclosure is a system that has a first network or device. The network or device has a first version control system that tracks and manages modifications/additions to a first digital asset and generates revision data. Further, the system has a second network or device that has a second version control system that tracks and manages modifications/addition to a second digital asset, which is physically isolated from the source network, and the second digital asset has data indicative of the first digital asset without modification and/or additions. Additionally, the system has a transfer device that couples the first network or device to the second network or device and receives the revision data, wherein the second version control system receives data indicative of the revision data when the transfer device is coupled to the source network and the destination and applies the revision data to the second digital asset.

23 Claims, 9 Drawing Sheets

(56) References Cited

U.S. PATENT DOCUMENTS

2026/0178308 A1* 6/2026 Lee .......................... G06F 8/65

FOREIGN PATENT DOCUMENTS

CN 121188033 A * 12/2025
EP 3588859 A1 * 1/2020 ............ H04L 67/34

* cited by examiner

REVISION CONTROL SYSTEMS AND METHODS ACROSS DISPARATE NETWORKS

BACKGROUND

Existing solutions for revision control in data management and communication systems where networks are isolated, disconnected, or incapable of direct interaction, are limited and often involve manual data transfer or ad hoc processes that lack security, efficiency, or scalability. This presents significant challenges in ensuring data consistency, mitigating conflicts, and maintaining the integrity of revision histories across isolated networks. There is, therefore, a need for a system that enables secure and reliable revision control without requiring persistent or direct network connections.

In modern computing environments, revision control systems are essential for managing the evolution of digital assets such as software, documentation, and configuration files. Traditional revision control systems rely on continuous connectivity between systems to synchronize changes, resolve conflicts, and maintain version histories. However, certain operational environments, such as those in defense, critical infrastructure, or air-gapped networks, are characterized by strict isolation and the absence of direct network connectivity.

DESCRIPTION OF FIGURES

The present disclosure can be better understood with reference to the following drawings. The elements in these drawings are not necessarily drawn to scale but are included to clearly illustrate the principles pertaining to this disclosure. Furthermore, like reference numerals designate corresponding parts throughout the views.

DETAILED DESCRIPTION

The present disclosure is a revision control system implemented to effectively manage and maintain digital assets across isolated networks that lack direct connectivity. The revision control system synchronizes updates, ensures data consistency, and manages version conflicts between the digital assets operating in the disconnected or air-gapped environments.

In one embodiment, the revision control system communicates through intermediary devices or transfer mediums capable of securely bridging the networks, such as portable storage devices, encrypted messages, or other indirect data exchange methods. In one embodiment, the revision control system validates data integrity, resolves conflicts arising from concurrent modifications, and maintains an audit trail of changes. In such an embodiment, the revision control system ensures the secure and reliable exchange of revision-controlled data without requiring persistent or direct network connections, addressing a critical need in environments with stringent security, operational, or technical constraints.

Notably, the present disclosure describes a system and method for facilitating revision control and synchronization of digital assets across isolated networks that lack direct connectivity. The invention addresses the limitations of conventional systems by introducing a secure, scalable, and automated approach to transferring, validating, and reconciling revision data in environments where persistent network connections are impractical or prohibited.

Figure 1A:
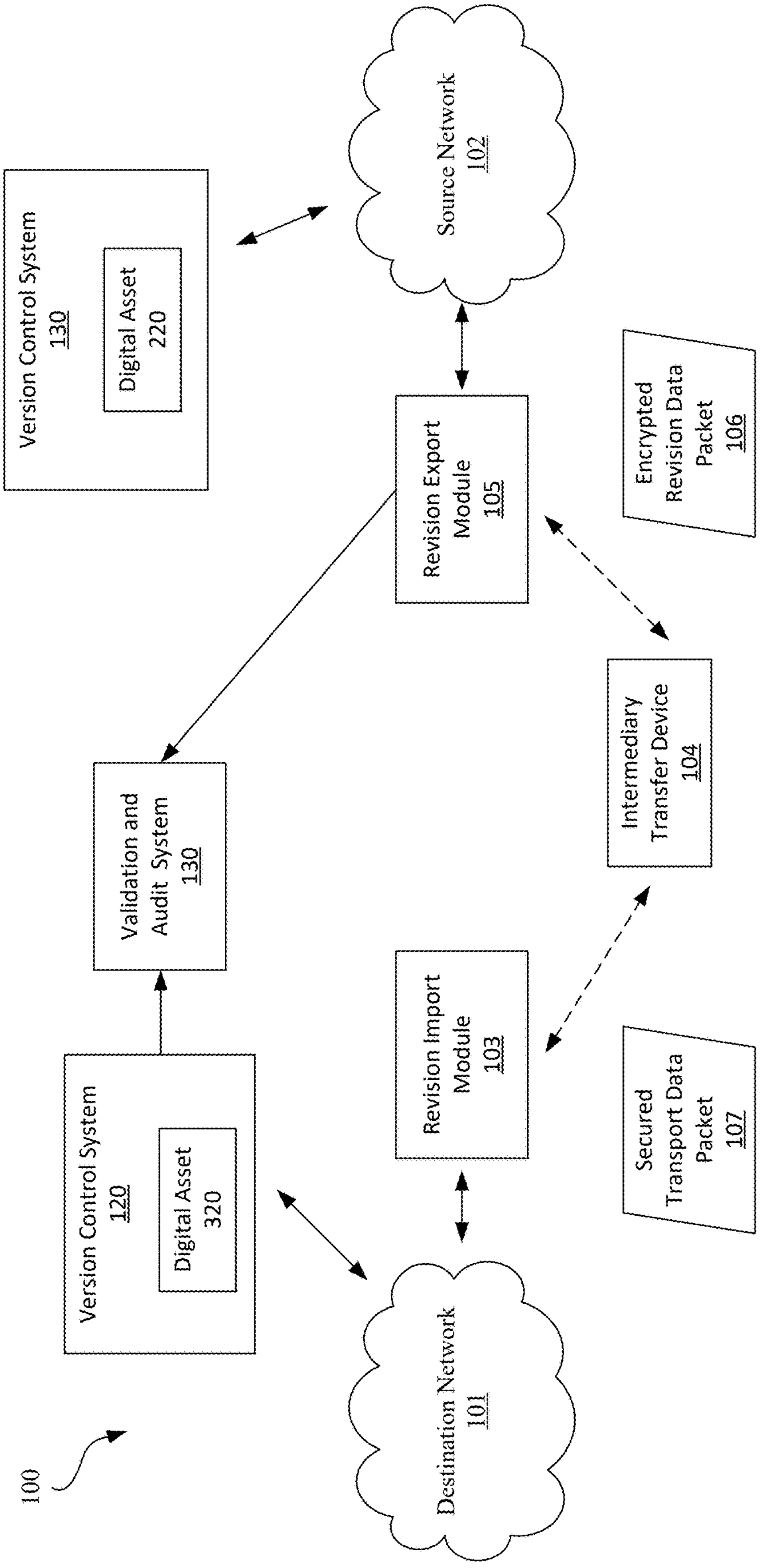
FIG. 1A is a revision control system in accordance with an embodiment of the present disclosure having disparate networks.

FIG. 1A is a revision control system 100 in accordance with an embodiment of the present disclosure. The revision control system 100 comprises two disparate networks, including source network 102 and destination network 101. The source network 102 and the destination network 101 are communicatively and physically isolated. That is, there is no connection, direct or indirect, through which information or data is capable of being transferred from the source network 102 to the destination network 101 or vice versa.

A digital asset 220 resides on the source network 102, which, for purposes of description is in time a duplicate of digital asset 320. However, as users (not shown) modify/change the digital asset 220 over time, e.g., in a software development environment, the digital asset 320 becomes different than digital asset 220.

When digital asset 220 has been modified/changed over time, synchronization may be warranted, i.e., a synchronization event is activated. That is, the modification/changes to the digital asset 220 be propagated to the destination network 101. Thus, upon activation by a user or automatically, the revision export module 105 packages and encrypts the modification/changes to digital asset 220 in encrypted revision data 106. Packaging and encryption is described further herein. Further, the revision export module 105 records information related to the synchronization event, i.e., revisions to digital asset 320 to reflect digital asset 220, in log data (not shown) describing details of the event, including timestamps, use actions and data indicative of resolved conflicts.

The revision export module 105 transfers the encrypted revision data 106 to an intermediary transfer device 104, which is temporarily connected and bridged between the revision export module 105 and the revision import module 103. The intermediary transfer device 104 transfers secured transport data 107 to the revision import module 103.

Note that in one embodiment, the intermediary transfer device 104 may comprise hardware or software encryption and tamper-detection mechanisms employed with respect to the encrypted revision data 106. However, in other embodiments, the intermediary transfer device 104 may serve as a conduit only performing no functions with respect to the encrypted revision data 106.

Upon receipt of the secured transport data packet 107, the revision import module 103 decrypts the secured transport data packet 107. After decryption, the revision import module 103 merges into to the digital asset 320 into a local version control system 120. In one embodiment, the revision import module 103 detects and resolves conflicts to ensure consistent integration of revisions. Further, the revision import module 103 records information related to the synchronization event to log data (not shown) describing details of the event, including timestamps, use actions and data indicative of resolved conflicts.

Further, the revision control system 100 comprises a validation and audit system 140. The validation and audit system 140 cross-checks the revision history against predefined rules or signatures. Further, the revision export module 105 shares data indicative of the revision transfer and modifications, i.e., the synchronization event, to update an audit trail, including details of the operation. In this regard, the validation and audit system 140 reconciles the log data from version control system 120 with log data from version control system 130 to ensure that changes made to digital asset 320 reflect those modifications/changes made to the digital asset 220.

Note that while source network 102 is described herein as the initiating or originating source for transmitting or transferring revision data to the destination network 101 for exemplary purposes, the destination network 101 may also initiate or originate revision data. In such an embodiment, the destination network 101 may function as the "source" of revision data that is transmitted or transferred to the source network 102, which then functions as the "destination" of the revision data.

Figure 1B:
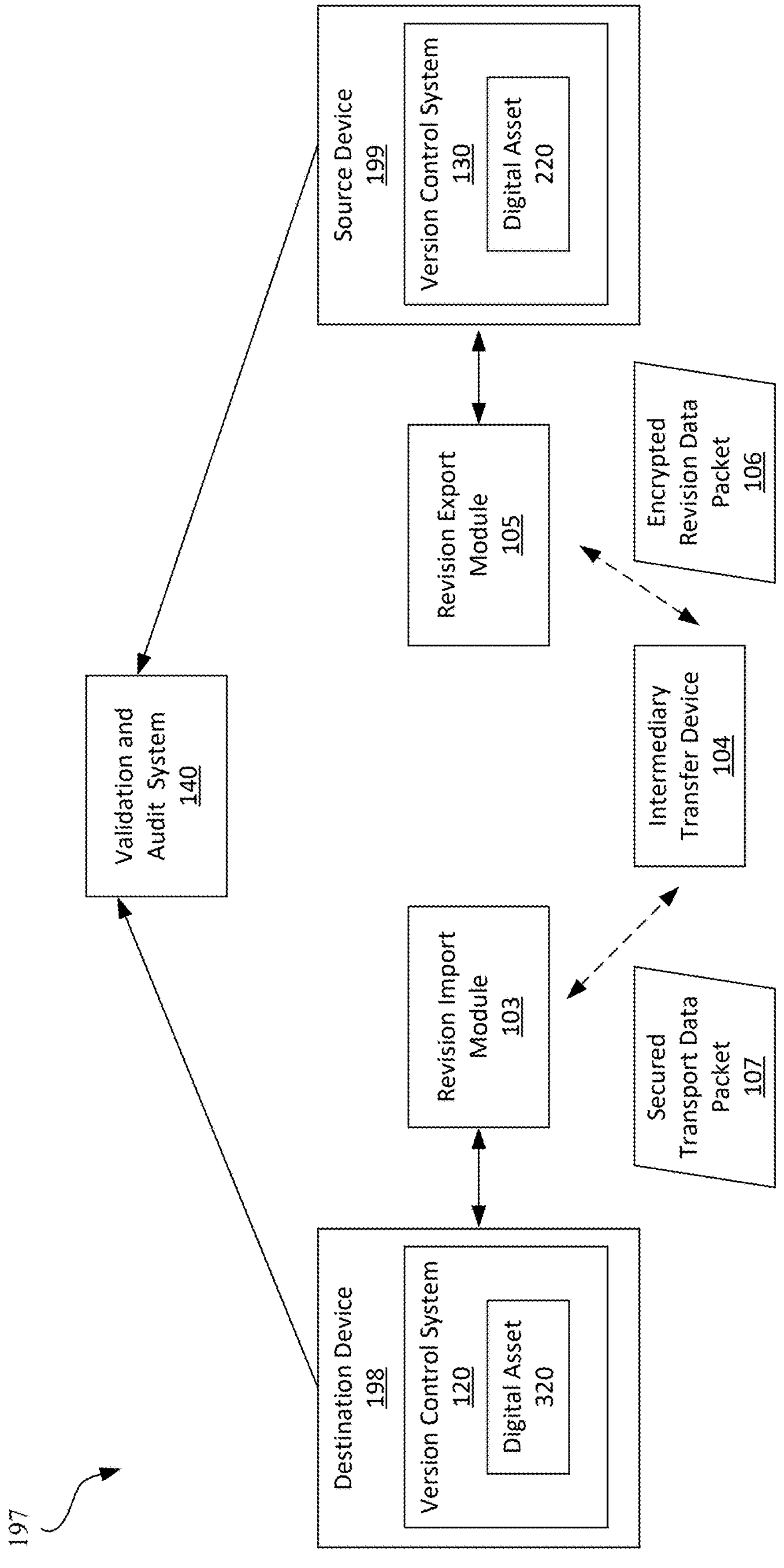
FIG. 1B is a revision control system in accordance with an embodiment of the present disclosure having disparate devices.

FIG. 1B is a revision control system 197 in accordance with an embodiment of the present disclosure. The revision control system 197 comprises two disparate devices, including source device 199 and destination device 198. The source device 199 and the destination device 198 are communicatively and physically isolated. That is, there is no connection, direct or indirect, through which information or data is capable of being transferred from the source device 199 to the destination device 198 or vice versa.

The system 197 functions substantially like the system 100 (FIG. 1A). In this regard, a digital asset 220 resides on the source device 199, which, for purposes of description is in time a duplicate of digital asset 320. However, as users (not shown) modify/change the digital asset 220 over time, e.g., in a software development environment, the digital asset 320 becomes different than digital asset 220.

When digital asset 220 has been modified/changed over time, synchronization may be warranted, i.e., a synchronization event is activated. That is, the modification/changes to the digital asset 220 be propagated to the destination device 198. Thus, upon activation by a user or automatically, the revision export module 105 packages and encrypts the modification/changes to digital asset 220 in encrypted revision data 106. Packaging and encryption is described further herein. Further, the revision export module 105 records information related to the synchronization event, i.e., revisions to digital asset 320 to reflect digital asset 220, in log data (not shown) describing details of the event, including timestamps, use actions and data indicative of resolved conflicts.

The revision export module 105 transfers the encrypted revision data 106 to an intermediary transfer device 104, which is temporarily connected and bridged between the revision export module 105 and the revision import module 103. The intermediary transfer device 104 transfers secured transport data 107 to the revision import module 103.

Note that in one embodiment, the intermediary transfer device 104 may comprise hardware or software encryption and tamper-detection mechanisms employed with respect to the encrypted revision data 106. However, in other embodiments, the intermediary transfer device 104 may serve as a conduit only performing no functions with respect to the encrypted revision data 106.

Upon receipt of the secured transport data packet 107, the revision import module 103 decrypts the secured transport data packet 107. After decryption, the revision import module 103 merges into to the digital asset 320 into a local version control system 120. In one embodiment, the revision import module 103 detects and resolves conflicts to ensure consistent integration of revisions. Further, the revision import module 103 records information related to the synchronization event to log data (not shown) describing details of the event, including timestamps, use actions and data indicative of resolved conflicts.

Further, the revision control system 197 comprises a validation and audit system 140. The validation and audit system 140 cross-checks the revision history against predefined rules or signatures. Further, the revision export module 105 shares data indicative of the revision transfer and modifications, i.e., the synchronization event, to update an audit trail, including details of the operation. In this regard, the validation and audit system 140 reconciles the log data from version control system 120 with log data from version control system 130 to ensure that changes made to digital asset 320 reflect those modifications/changes made to the digital asset 220.

Note that while source device 199 is described herein as the initiating or originating source for transmitting or transferring revision data to the destination device 198 for exemplary purposes, the destination device 198 may also initiate or originate revision data. In such an embodiment, the destination device 198 may function as the "source" of revision data that is transmitted or transferred to the source device 199, which then functions as the "destination" of the revision data.

Figure 2:
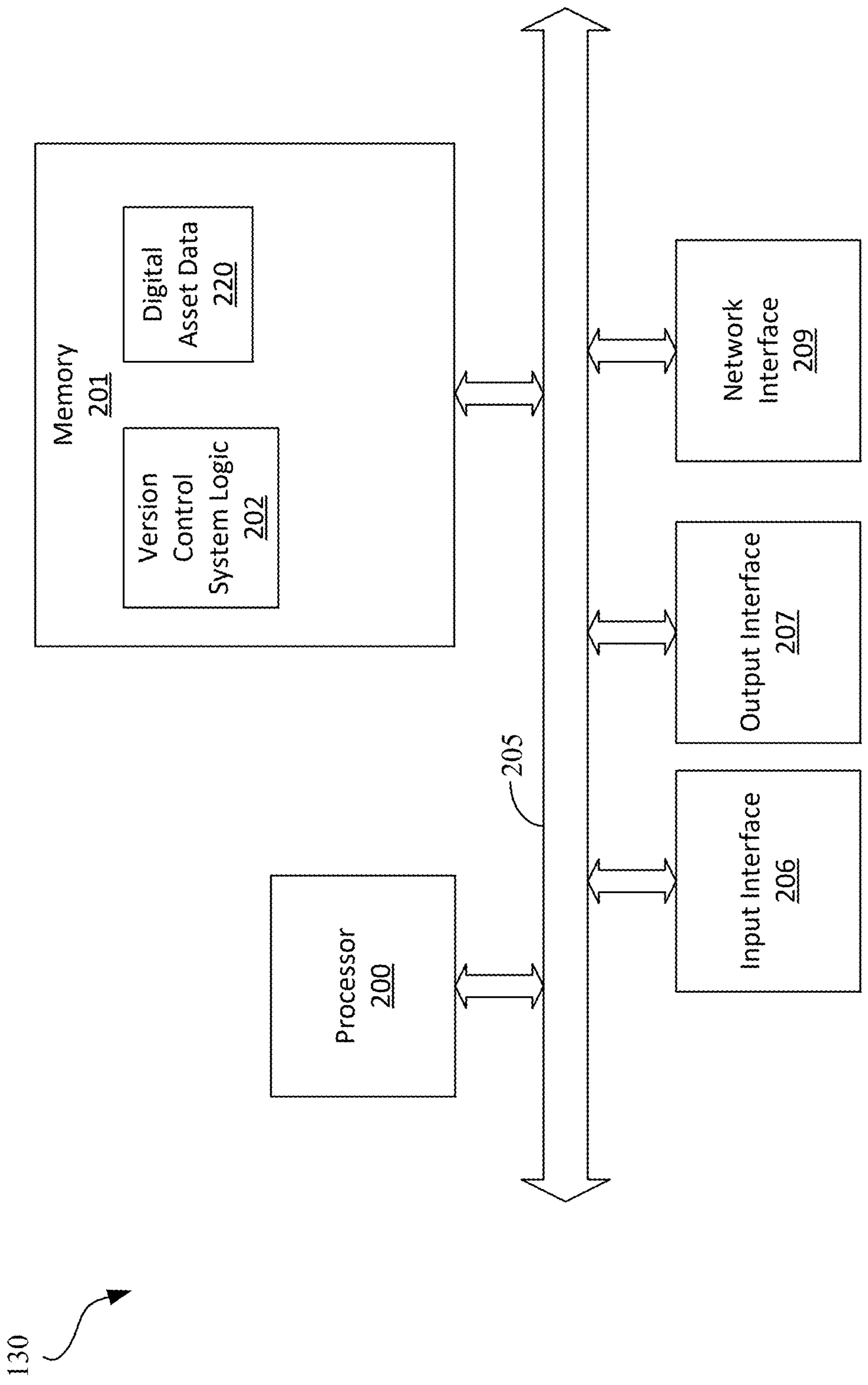
FIG. 2 is a block diagram of an exemplary version control system of a source network as shown in FIG. 1.

FIG. 2 is a block diagram of an exemplary version control system 130 in accordance with an embodiment of the present disclosure. The version control system 130 is communicatively coupled to the source network 101, and it comprises at least one conventional processor 200, such as a digital signal processor (DSP) or a central processing unit (CPU), that communicates with the components of the version control system 130 via a local interface 205, which can include at least one bus. Further, the processor 200 is configured to execute instructions of software, such as the version control system logic 202.

The version control system logic 202 controls the functionality of the version control system 130, as will be described in more detail hereafter. It should be noted that the version control system logic 202 can be implemented in software, hardware, firmware, or any combination thereof. In an exemplary embodiment illustrated in FIG. 2, the version control system logic 202 is implemented in software and stored in memory 201.

Note that the revision version control system logic 202, when implemented in software, can be stored and transported on any computer-readable medium for use by or in connection with an instruction execution apparatus that can fetch and execute instructions. In the context of this document, a "computer-readable medium" can be any means that can contain or store a computer program for use by or in connection with an instruction execution apparatus.

Additionally, the version control system 130 comprises digital asset data 220 stored in memory 201. In one embodiment, the digital asset data 220 may comprise digital data and/or information related to files, software, monetary accounts, or cryptocurrencies, for example. The version control system logic 202 tracks and manages changes to the digital data and/or information and maintains a history of modifications and/or additions. In one embodiment, the version control system logic 202 allows easy reversion to a previous version of the digital asset 220.

An input interface 206, for example, a keyboard, keypad, or mouse, can be used to input data from a user of the revision export module 105, and an output interface 207, for example, a printer or display screen (e.g., a liquid crystal display (LCD)), can be used to output data to the user.

Further, a network interface 209 may be used by the version control system logic 202 to retrieve data and/or information, e.g., source files, for the digital asset 220 from the network interface 209. Further, the version control system logic 202 generates revision data 208 that is provided to the revision export module 105 via the network interface 209.

Figure 3:
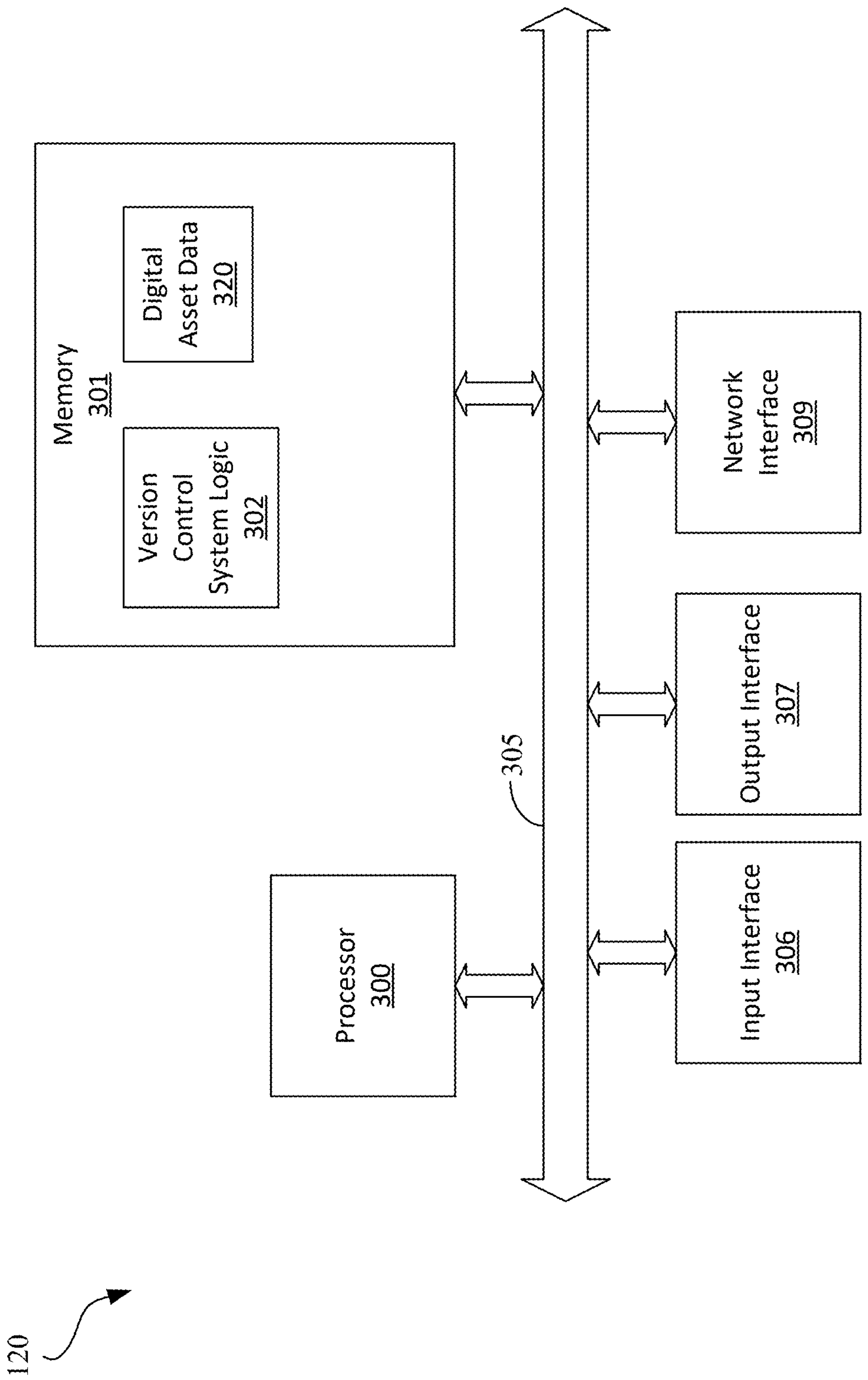
FIG. 3 is a block diagram of an exemplary version control system of a destination network as shown in FIG. 1.

FIG. 3 is a block diagram of an exemplary version control system 120 in accordance with an embodiment of the present disclosure. The version control system 120 is communicatively coupled to the destination network 101, and it comprises at least one conventional processor 300, such as a digital signal processor (DSP) or a central processing unit (CPU), that communicates with the components of the version control system 120 via a local interface 305, which can include at least one bus. Further, the processor 300 is configured to execute instructions of software, such as the version control system logic 302.

The version control system logic 302 controls the functionality of the version control system 120, as will be described in more detail hereafter. It should be noted that the version control system logic 302 can be implemented in software, hardware, firmware, or any combination thereof. In an exemplary embodiment illustrated in FIG. 3, the version control system logic 302 is implemented in software and stored in memory 301.

Note that the revision version control system logic 302, when implemented in software, can be stored and transported on any computer-readable medium for use by or in connection with an instruction execution apparatus that can fetch and execute instructions. In the context of this document, a "computer-readable medium" can be any means that can contain or store a computer program for use by or in connection with an instruction execution apparatus.

Additionally, the version control system 120 comprises digital asset data 320 stored in memory 301. In one embodiment, the digital asset data 320 may comprise digital data and/or information related to files, software, monetary accounts, or cryptocurrencies, for example. The version control system logic 302 tracks and manages changes to the digital data and/or information corresponding to the digital asset 320 and maintains a history of modifications and/or additions. In one embodiment, the version control system logic 302 allows easy reversion to a previous version of the digital asset 320.

At a point in time, the digital asset 320 comprises data and/or information identical to the digital asset 220 (FIGS. 1 and 2). In one example, the digital asset 220 may be in a development environment, and as changes are made to the data and/or information, e.g., files, the delta (or difference) between digital asset 320 and digital asset 220 become different.

An input interface 306, for example, a keyboard, keypad, or mouse, can be used to input data from a user of the revision export module 105, and an output interface 307, for example, a printer or display screen (e.g., a liquid crystal display (LCD)), can be used to output data to the user.

Further, a network interface 309 may be used by the version control system logic 302 to retrieve data and/or information, e.g., source files, for the digital asset 320 from the network interface 309.

Figure 4:
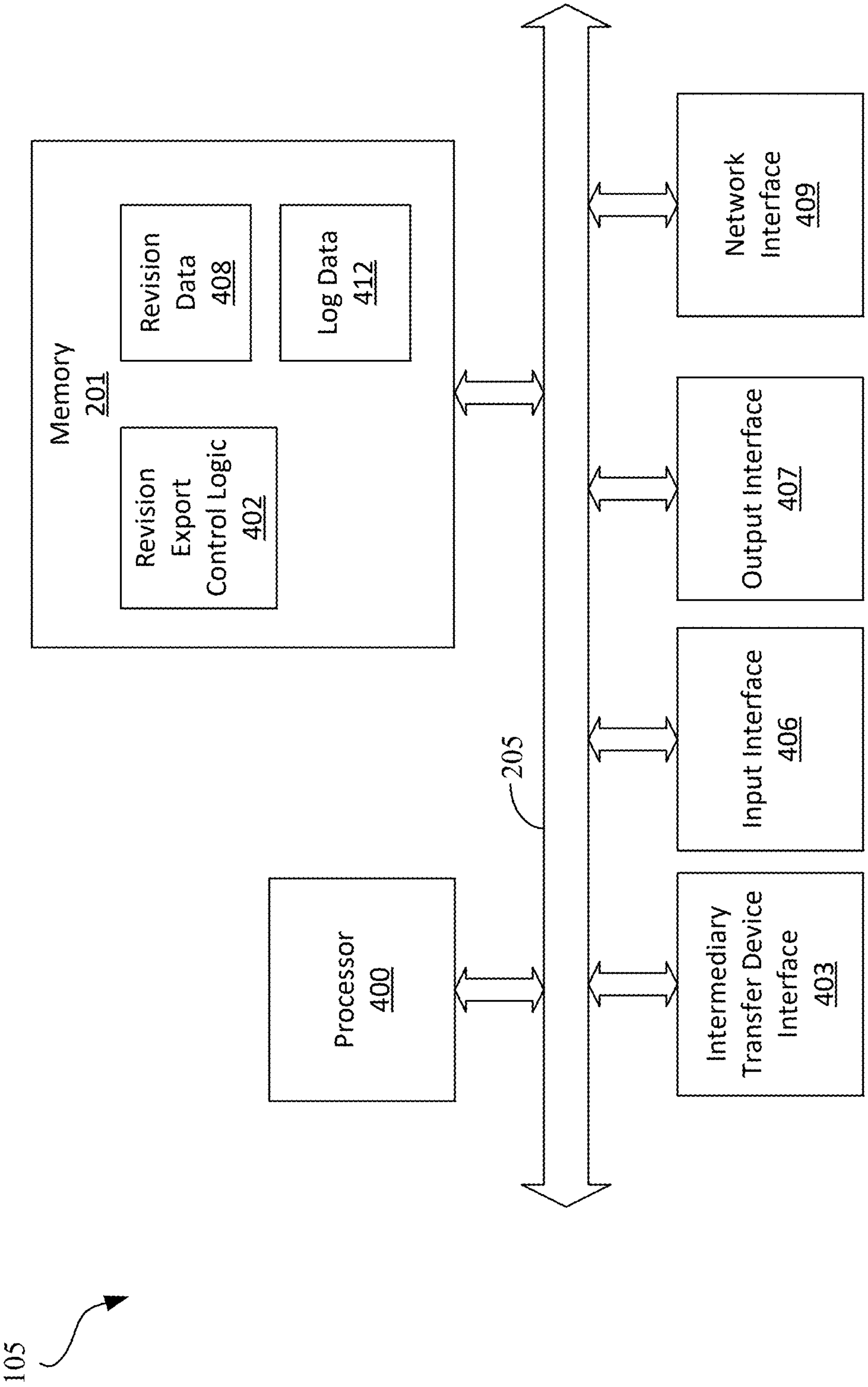
FIG. 4 is a block diagram of an exemplary revision export module as shown in FIG. 1A and FIG. 1B.

FIG. 4 is a block diagram of an exemplary revision export module 105 in accordance with an embodiment of the present disclosure. The revision export module 105 comprises at least one conventional processor 400, such as a digital signal processor (DSP) or a central processing unit (CPU), revision export module 105 via a local interface 405, which can include at least one bus. Further, the processor 400 is configured to execute instructions of software, such as the revision export control logic 402.

The revision export control logic 402 controls the functionality of the revision export module 105, as will be described in more detail hereafter. It should be noted that the revision export control logic 402 can be implemented in software, hardware, firmware, or any combination thereof. In an exemplary embodiment illustrated in FIG. 4, the revision export control logic 402 is implemented in software and stored in memory 401.

Note that the revision export control logic 402, when implemented in software, can be stored and transported on any computer-readable medium for use by or in connection with an instruction execution apparatus that can fetch and execute instructions. In the context of this document, a "computer-readable medium" can be any means that can contain or store a computer program for use by or in connection with an instruction execution apparatus.

An input interface 406, for example, a keyboard, keypad, or mouse, can be used to input data from a user of the revision export module 105, and an output interface 407, for example, a printer or display screen (e.g., a liquid crystal display (LCD)), can be used to output data to the user. In addition, an intermediary transfer device interface 403 enables selected communication with the revision import module 103 (FIG. 1) through the transfer device 104 (FIG. 1).

Further, a network interface 409 may be used by the revision export control logic 402 to retrieve one or more digital asset 220 via the network interface 409. In this regard, the network interface 409 is communicatively coupled to the source network 102 from which the digital asset 220 may be retrieved.

The revision export control logic 402 packages and encrypts revision data 408 related to a digital asset 220 into the encrypted revision data packet 106. In one embodiment, the revision data 208 may include data indicative of metadata, version histories, and conflict resolution markers. Note the version history data may include data indicative of changes made to the digital asset 220 over time, the metadata may include data indicative of the context and information about the digital asset's creation, structure, purposes and dependencies, and the conflict resolution markers may include data indicative of where conflicts exist related to a the digital asset 220 and a formerly propagated digital asset 320 (FIG. 3) to be transferred, validated, and reconciled on by the revision import module 103.

The revision export control logic 402 transfers the encrypted revision data packet 106 to the intermediary transfer device 104 (FIG. 1) via the intermediary transfer device interface 403, as described with reference to FIG. 1.

Figure 5:
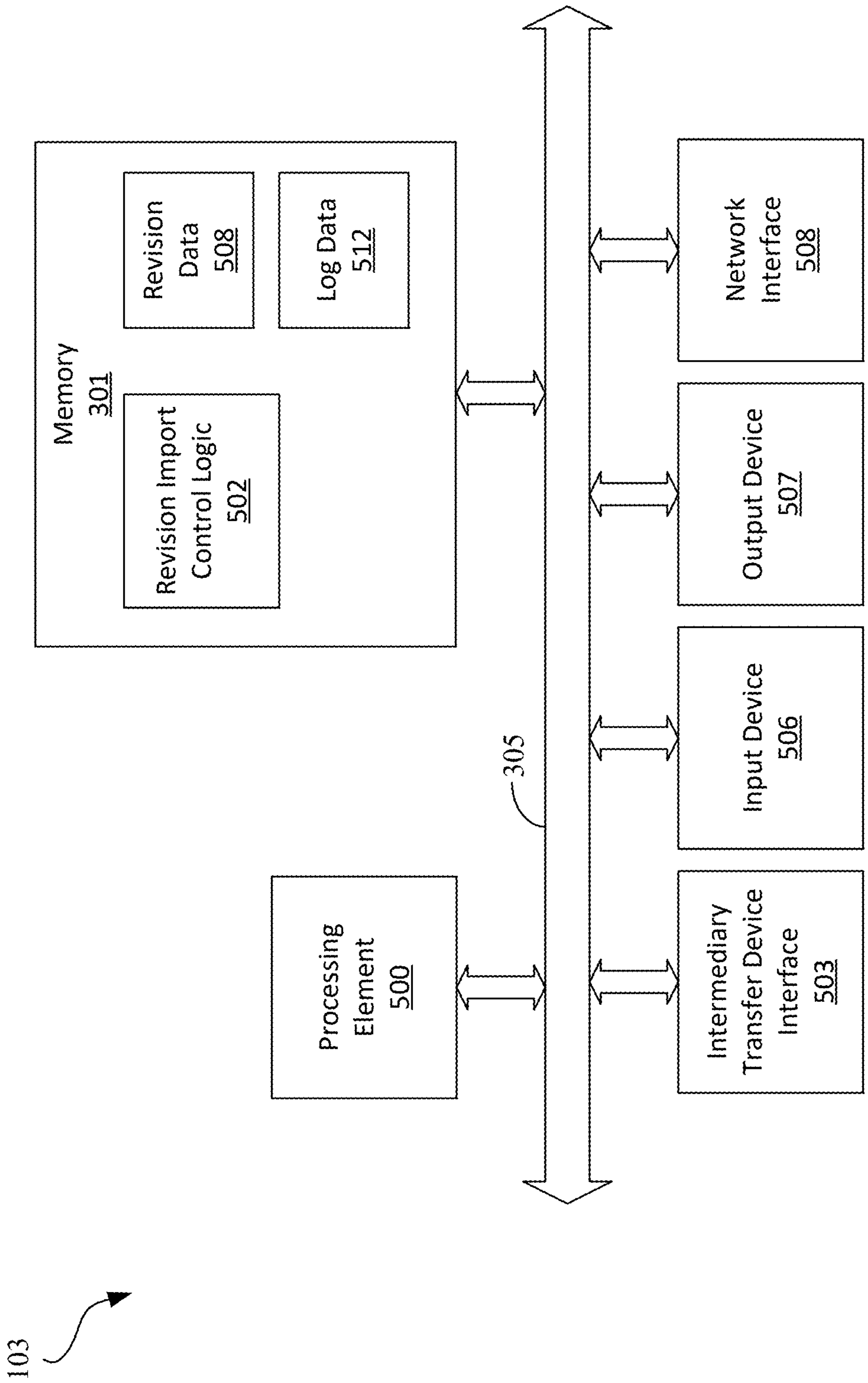
FIG. 5 is a block diagram of an exemplary revision import module as shown in FIG. 1A and FIG. 1B.

FIG. 5 is a block diagram of an exemplary revision import module 103 in accordance with an embodiment of the present disclosure. The revision import module 103 comprises at least one conventional processor 500, such as a digital signal processor (DSP) or a central processing unit (CPU), revision import module 103 via a local interface 505, which can include at least one bus. Further, the processing element 500 is configured to execute instructions of software, such as the revision import control logic 502.

The revision import control logic 502 controls the functionality of the revision import module 103, as will be described in more detail hereafter. It should be noted that the revision import control logic 502 can be implemented in software, hardware, firmware, or any combination thereof. In an exemplary embodiment illustrated in FIG. 5, the revision import control logic 502 is implemented in software and stored in memory 501.

Note that the revision import control logic 502, when implemented in software, can be stored and transported on any computer-readable medium for use by or in connection with an instruction execution apparatus that can fetch and execute instructions. In the context of this document, a "computer-readable medium" can be any means that can contain or store a computer program for use by or in connection with an instruction execution apparatus.

An input interface 506, for example, a keyboard, keypad, or mouse, can be used to input data from a user of the revision export module 105, and an output interface 507, for example, a printer or display screen (e.g., a liquid crystal display (LCD)), can be used to output data to the user. In addition, an intermediary transfer device interface 503 enables selected communication with the revision import module 103 through the transfer device 104 (FIG. 1).

The revision import control logic 502 receives and decrypts the secured transport data packet 107 to obtain revision data 508 related to a digital asset 220 (FIG. 2). Once decrypted, the revision import control logic 502 transfers the revision data 508 to the version control system 120. As described hereinabove, the version control system 120 receives the revision data 508 and merges modifications/changes indicated in the metadata, histories, and conflict resolution markers for digital asset 220 and updates the digital asset 320 (FIG. 1) to the current version of digital asset 220.

Figure 6:
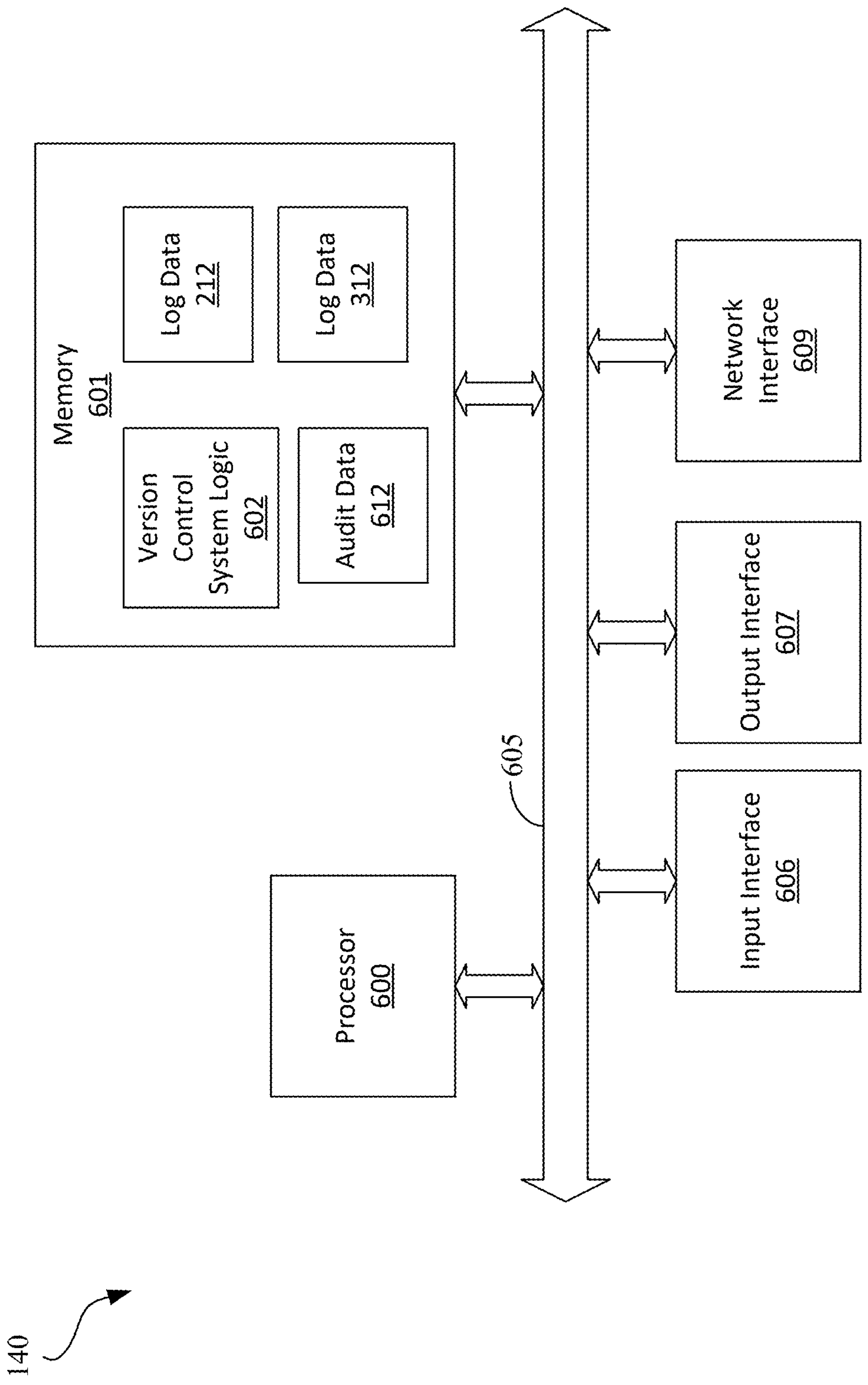
FIG. 6 is a block diagram of an exemplary validation and audit system as shown in FIG. 1B.

FIG. 6 is a block diagram of an exemplary validation and audit system 140 in accordance with an embodiment of the present disclosure. The validation and audit system 140 comprises at least one conventional processor 600, such as a digital signal processor (DSP) or a central processing unit (CPU), revision import module 103 via a local interface 605, which can include at least one bus. Further, the processor 600 is configured to execute instructions of software, such as the validation and audit control logic 602.

The validation and audit control logic 602 controls the functionality of the validation and audit system 140, as will be described in more detail hereafter. It should be noted that the validation and audit control logic 602 can be implemented in software, hardware, firmware, or any combination thereof. In an exemplary embodiment illustrated in FIG. 6, the validation and audit control logic 602 is implemented in software and stored in memory 601.

Note that the validation and audit control logic 602, when implemented in software, can be stored and transported on any computer-readable medium for use by or in connection with an instruction execution apparatus that can fetch and execute instructions. In the context of this document, a "computer-readable medium" can be any means that can contain or store a computer program for use by or in connection with an instruction execution apparatus.

An input interface 606, for example, a keyboard, keypad, or mouse, can be used to input data from a user of the validation and audit system 140, and an output interface 607, for example, a printer or display screen (e.g., a liquid crystal display (LCD)), can be used to output data to the user. In addition, a network interface 609 enables selected communication with the version control system 120.

The validation and audit control logic 602 receives log data 212 via the network interface 609 from the version control system 130. Further, the validation and audit control logic 602 receives log data 312 from the version control system 120.

Upon receipt, the validation and audit control logic 602 compares the log data 212 with the log data 312. In one embodiment, the validation and audit control logic 602 stores audit data 612 indicative of the comparison.

Figure 7:
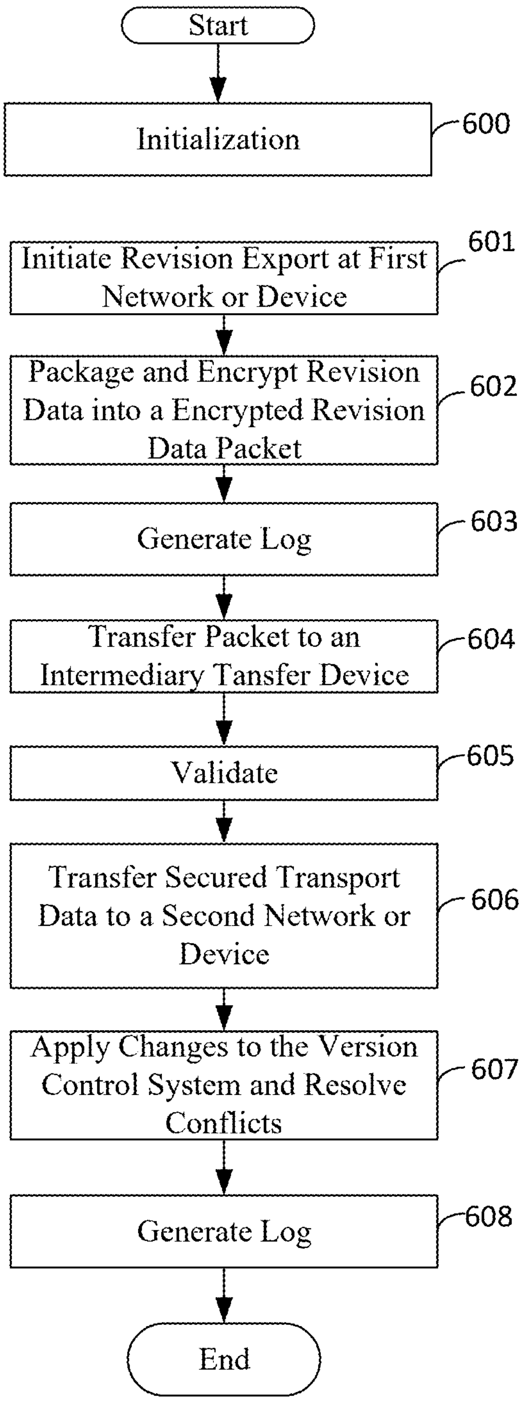
FIG. 7 is a flowchart exhibiting exemplary architecture and functionality for the revision control system of FIG. 1A.

FIG. 7 is a flowchart of exemplary architecture and functionality of the revision control system 100 of the present disclosure.

In step 700, initialization is performed configuring the revision export module 105 (FIG. 1) and the revision import module 103 (FIG. 1) with encryption keys, synchronization rules, and validation protocols. Initialization may be performed automatically or manually.

In step 701, a user or an automated process initiates revision export related to the digital asset 220 (FIG. 1) at the first network 102 (FIG. 1A) or device 199 (FIG. 1B). A user may use the input interface 406 and the output interface 407 to initiate revision export.

In step 702, the revision export control logic 402 (FIG. 4) receives revision data 208 (FIG. 2) from the version control system (FIGS. 1 and 2). In one embodiment, the revision export control logic 402 may request the revision data 208 during initiation in step 601. In step 703, the revision export control logic 402 (FIG. 4) packages and encrypts revision data 408 (FIG. 4) into an encrypted revision data packet 106 (FIGS. 1 and 4).

In step 704, the revision export control logic 405 transfers the encrypted revision data packet 106 to the intermediary transfer device 104 (FIG. 1). The intermediary transfer device 104 validates the encrypted revision data packet 106, in step 705, and transfers the secured transport data packet 107 to the second network 101 (FIG. 1A) or device 198 (FIG. 1B) in step 606.

The revision import control logic 502 receives the secured transport data packet 107. Upon receipt, the revision import control logic 502 decrypts the secured transport data packet 107 to obtain revision data 508 in step 707. The revision import control logic 502 transmits the revision data 508 to the version control system 120 (FIGS. 1 and 3) in step 708.

In step 709, the version control system logic 120 applies modification/changes to the digital asset 320 based on the revision data 508.

Figure 8:
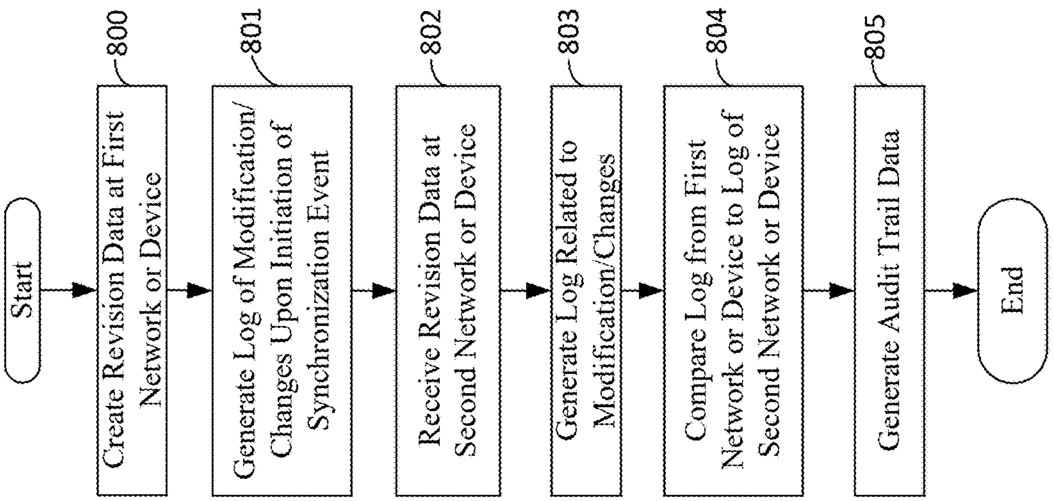
FIG. 8 is a flowchart exhibiting exemplary architecture and functionality for the validation and audit system of FIG. 1A and FIG. 1B.

FIG. 8 is a flowchart of exemplary architecture and functionality of the revision control system 100 of the present disclosure.

In step 700, initialization is performed configuring the revision export module 105 (FIG. 1) and the revision import module 103 (FIG. 1) with encryption keys, synchronization rules, and validation protocols. Initialization may be performed automatically or manually.

In step 701, a user or an automated process initiates revision export related to the digital asset 220 (FIG. 1) at the first network 102 (FIG. 1A) or device 199 (FIG. 1B). A user may use the input interface 406 and the output interface 407 to initiate revision export.

In step 702, the revision export control logic 402 (FIG. 4) receives revision data 208 (FIG. 2) from the version control system (FIGS. 1 and 2). In one embodiment, the revision export control logic 402 may request the revision data 208 during initiation in step 601. In step 703, the revision export control logic 402 (FIG. 4) packages and encrypts revision data 408 (FIG. 4) into an encrypted revision data packet 106 (FIGS. 1 and 4).

In step 704, the revision export control logic 405 transfers the encrypted revision data packet 106 to the intermediary transfer device 104 (FIG. 1). The intermediary transfer device 104 validates the encrypted revision data packet 106, in step 705, and transfers the secured transport data packet 107 to the second network 101 (FIG. 1A) or device 198 (FIG. 1B) in step 606.

The revision import control logic 502 receives the secured transport data packet 107. Upon receipt, the revision import control logic 502 decrypts the secured transport data packet 107 to obtain revision data 508 in step 707. The revision import control logic 502 transmits the revision data 508 to the version control system 120 (FIGS. 1 and 3) in step 708.

In step 709, the version control system logic 120 applies modification/changes to the digital asset 320 based on the revision data 508.

FIG. 8 is a flowchart of exemplary architecture and functionality of the process of validation and audit.

In step 800, the version control system logic 202 (FIG. 2) creates revision data at the first network 102 (FIG. 1A) or device 199 (FIG. 1B). In addition, the version control system logic 202 generates log data 212 (FIG. 2) indicative of modifications/changes to the digital asset 220 (FIG. 2) upon initiation of a synchronization event, as described hereinabove in step 801.

In step 802, the validation and audit control logic 602 (FIG. 6) receives the log data 212 from the version control system 130.

In step 803, the version control system logic 302 generates log data 312 (FIG. 3) indicative of modifications/changes to the digital asset 320 (FIG. 3) upon initiation of a synchronization event, as described hereinabove in step 803.

In step 804, the validation and audit control logic 602 compares log data 212 from first network 102 or device 199 with log data 312 from second network 101 or device 198. In step 805, the validation and audit control logic 602 generates audit data 612 indicative of the comparison.

What I claim is:

1. A system, comprising: a first network or first device comprising a first version control system that tracks and manages modifications/additions to a first digital asset to generate revision data and for transmitting or transferring revision data indicative of modifications/additions; at least one second network or second device comprising a second version control system that tracks and manages modifications/addition to a second digital asset, the first network or first device communicatively and physically isolated from the second network or second device, the second digital asset comprising data indicative of the first digital asset without modification and/or additions; a transfer device configured for communicatively coupling the first network or first device to the second network or second device and for receiving the revision data, wherein the second version control system is configured for receiving data indicative of the revision data when the transfer device is coupled to the first network or first device and the second network or second device and applying the revision data to the second digital asset.

2. The system of claim 1, further comprising a first processor configured for encrypting the revision data and transmitting or transferring the revision data to the transfer device.

3. The system of claim 2, wherein the first processor is configured for performing encryption based upon manual activation.

4. The system of claim 2, wherein the first processor is configured for performing encryption based upon automated activation.

5. The system of claim 1, wherein the first processor is configured for transmitting or transferring the revision data upon manual activation.

6. The system of claim 1, wherein the first processor is configured for transmitting or transferring the revision data upon automated activation.

7. The system of claim 2, further comprising a second processor configured for decrypting the revision data upon receipt of the revision data from the transfer device.

8. The system of claim 1, further comprising a plurality of second networks or second devices.

9. The system of claim 1, wherein the first version control system is configured for storing first log data indicative of the modifications/changes applied to the first digital asset.

10. The system of claim 9, wherein the second version control system is configured for storing second log data indicative of the modification/changes applied to the second digital asset based upon the revision data.

11. The system of claim 10, wherein the first log data is compared to the second log data and audit data is generated based on the comparison.

12. A method, comprising: tracking and managing modifications/additions to a first digital asset residing on a first network or first device to generate revision data indicative of modifications/addition to the first digital asset; tracking and managing modifications/additions to a second digital asset on a second network or second device, the second digital asset comprising data indicative of the first digital asset without modifications and/or additions, the first network or first device communicatively and physically isolated from the second network or second device; transmitting or transferring revision data indicative of modifications/additions to a transfer device communicatively coupling the first network or first device to the second network or second device; receiving the revision data by the second network or second device; applying the revision data to the second digital asset.

13. The method of claim 12, further comprising performing encryption of the revision data based upon manual activation.

14. The method of claim 13, further comprising performing encryption of the encryption data based upon automated activation.

15. The method of claim 12, further comprising transmitting or transferring the revision data upon manual activation.

16. The method of claim 12, further comprising transmitting or transferring the revision data upon automated activation.

17. The method of claim 14, further comprising decrypting the revision data upon receipt of the revision data from the transfer device.

18. The method of claim 12, further comprising transmitting or transferring the revision data to a plurality of second network or second device.

19. The method of claim 12, further comprising storing first log data indicative of the modifications/changes applied to the first digital asset.

20. The method of claim 19, further comprising storing second log data indicative of the modification/changes.

21. The method of claim 20, further comprising applying modifications/additions to the second digital asset based upon the revision data.

22. The method of claim 21, further comprising comparing the second log data and the first log data.

23. The method of claim 22, further comprising generating audit data based on the comparison.

* * * * *